Aug. 11, 1964     F. T. JOHMANN     3,144,005
RETRACTION-PROTRACTION MECHANISM FOR WRITING INSTRUMENTS
Filed April 14, 1960     3 Sheets-Sheet 1
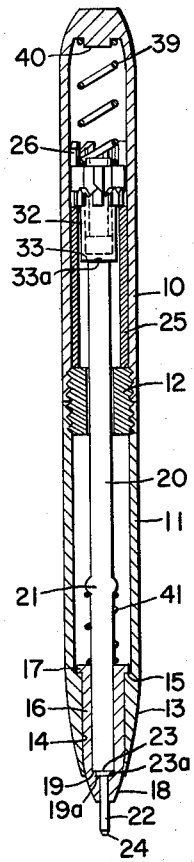
FIG.-1
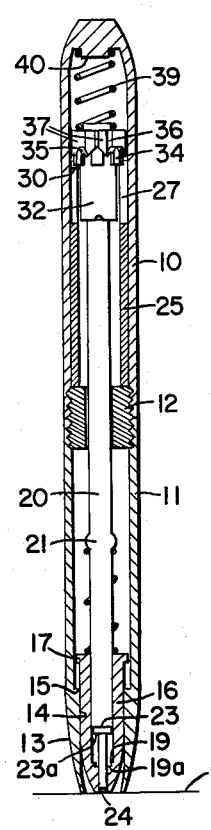
FIG.-2
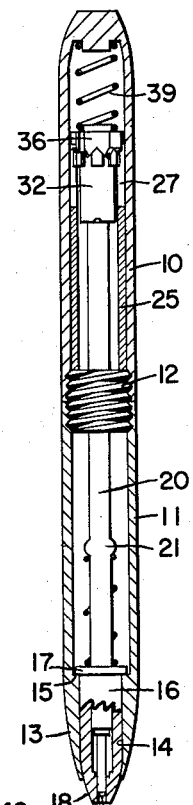
FIG.-3
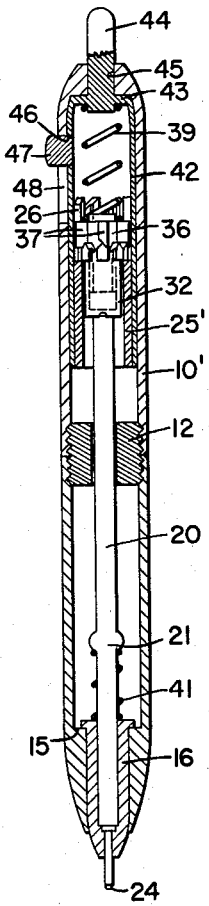
FIG.-11
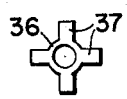
FIG.-5
FIG.-7
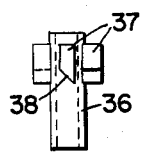
FIG.-4
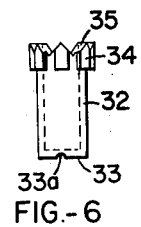
FIG.-6
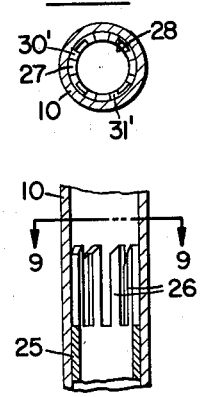
FIG.-9
FIG.-8
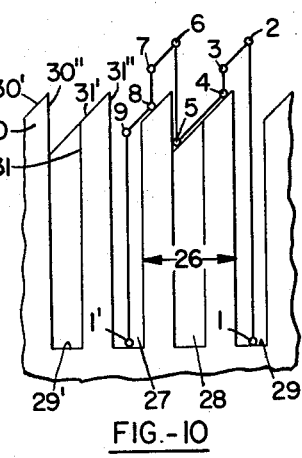
FIG.-10
Frank T. Johmann Inventor

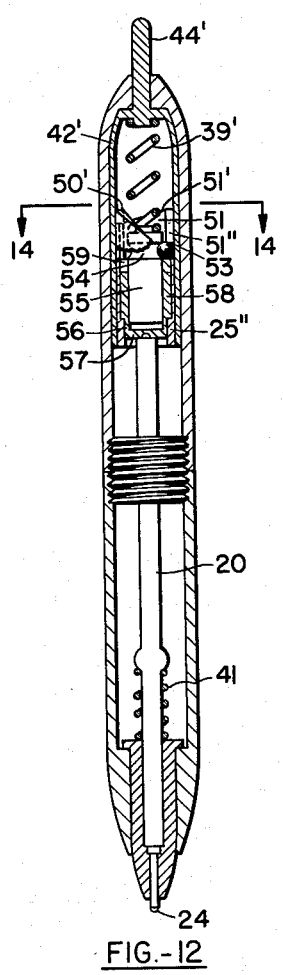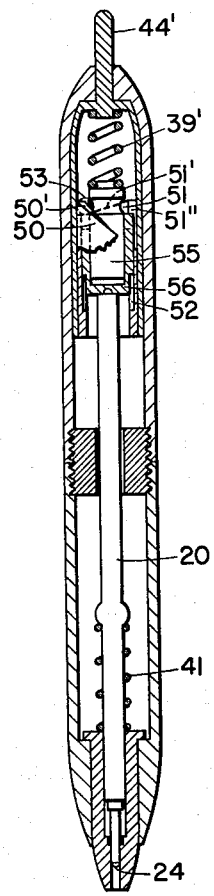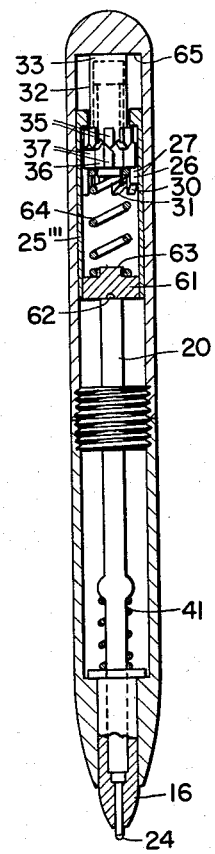
FIG.-12　　FIG.-13　　FIG.-17
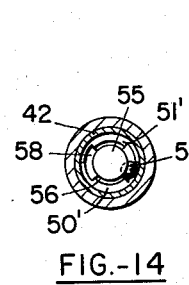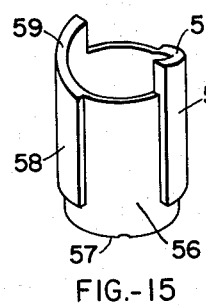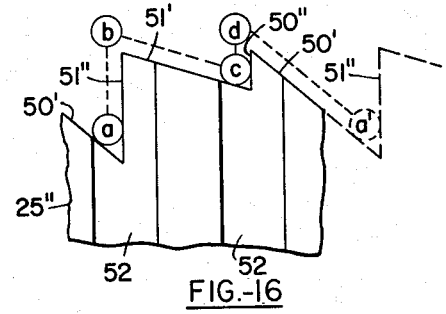
FIG.-14　　FIG.-15　　FIG.-16
Frank T. Johmann Inventor Frank T. Johmann
Inventor

United States Patent Office 3,144,005
Patented Aug. 11, 1964

3,144,005
RETRACTION-PROTRACTION MECHANISM FOR WRITING INSTRUMENTS
Frank T. Johmann, 49 Hampton Drive, Berkeley Heights, N.J.
Filed Apr. 14, 1960, Ser. No. 22,162
11 Claims. (Cl. 120—42.03)

This invention relates to writing instruments having a retractable writing point. Particularly, the invention relates to a retraction-protraction mechanism for a writing instrument whereby the point may be either moved into a concealed, non-writing position or projected into an exposed writing position.

This application is a continuation-in-part of my prior patent application, Serial No. 841,243, filed September 21, 1959, and now issued as U.S. Patent 3,051,132.

In the preferred form of my present invention, a ballpoint writing unit, including a cartridge, is maintained in a protracted position by a spring or other resilient means adapted to urge said unit outwardly relative to the casing or barrel. The lower writing end of the casing is resilient so as to be longitudinally movable relative to the main body of the casing. Preferably, this is accomplished by having the lower end of the casing in the form of a longitudinally slidable hood or sleeve which is resiliently mounted so that it can telescope back into the main body of the casing. The ballpoint, in writing position, projects through the lower end of said instrument, e.g. through the outer tip end of said hood. A latching means, provided within the barrel for holding the point and cartridge unit in either a retracted or protracted position, is actuated upon longitudinal movement of said unit. By providing a resiliently mounted point and cartridge unit, togther with a casing having a resilient lower end, the latching means can be actuated by pressing the writing end of the instrument down against a rigid surface to as to longitudinally move the point and cartridge unit relative to the main body of the casing. In this manner, the instrument is tip-actuated, i.e. the point is retracted into a concealed position within the hood or protracted into an exposed position where the point extends through the hood, by pressing the writing end of the instrument down against a rigid surface. In another embodiment of this invention, I have provided a mechanism which in addition to being tip-actuated, may be also actuated by a plunger or pushbutton extending through the upper end or side of the barrel.

The invention will be further understood by the following description and the accompanying drawings which include a preferred embodiment of my invention. In the drawings:

FIGURE 1 is a longitudinal view, partly in section, of a writing instrument of the invention with the ballpoint in a protracted position.

FIGURE 2 is a longitudinal view, partly in section, of the writing instrument of FIGURE 1, wherein the point and its hood have been forced inwardly relative to the barrel by pressing the instrument downward against a rigid surface.

FIGURE 3 is a longitudinal view, partly in section, of the writing instrument of FIGURE 1, showing the point retained in a retracted position within the hood after the instrument has been lifted free from contact with the rigid surface.

FIGURE 4 is an enlarged side view of the latch element shown in FIGURES 1 to 3.

FIGURE 5 is a top view of the latch element of FIG. 5.

FIGURE 6 is an enlarged side view of the latch actuating element shown in FIGURES 1 to 3.

FIGURE 7 is a top view of the latch actuating element of FIGURE 6.

FIGURE 8 is a slightly enlarged sectional view of a portion of the latch receiving means shown in FIGURES 1 to 3.

FIGURE 9 is a top view taken along the lines 9—9 of FIGURE 8.

FIGURE 10 is a schematic diagram illustrating the relative positions of a projecting ear of the latch element with regard to the latch receiving means at various stages of operation of the retraction-protraction mechanism.

FIGURE 11 is a longitudinal view, partly in section, of another writing instrument of the invention, wherein the writing instrument is both tip-actuated and push-button actuated.

FIGURE 12 is a longitudinal view, partly in section, of another embodiment of the invention with the point exposed and showing a modification of the latching means.

FIGURE 13 is a longitudinal view similar to that of FIGURE 12 but showing the point in a retracted position.

FIGURE 14 is a cross-sectional view taken along the lines 14—14 of FIGURE 12.

FIG. 15 is a perspective view of the latch actuating element of FIGURES 12 to 14.

FIGURE 16 is a schematic diagram further illustrating the latching means of FIGURES 12 to 15.

FIGURE 17 is a longitudinal view, partly in section, of still another embodiment of the invention.

Figure 18:
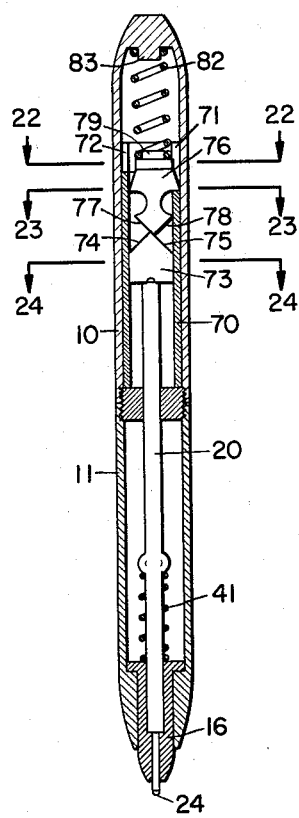
FIGURE 18 is a longitudinal view, partly in section, of yet another embodiment of the invention wherein the writing point is protracted.
Figure 19:
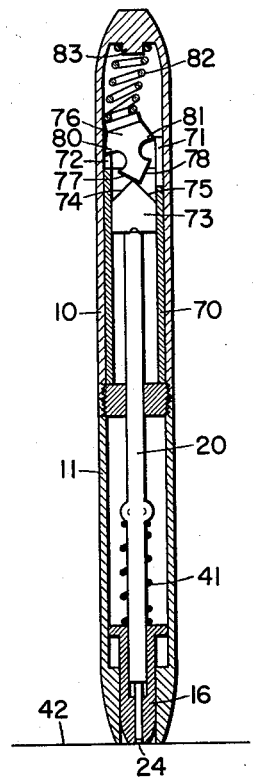
FIGURE 19 is a longitudinal view, partly in section, of the embodiment of FIGURE 18, wherein the instrument has been pressed downward against a rigid surface.
Figure 20:
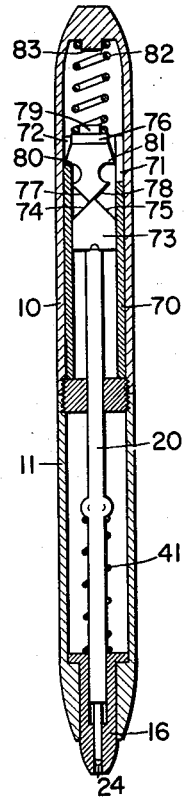
FIGURE 20 is a longitudinal view, partly in section, of the embodiment of FIGURES 18 and 19, showing the writing point in a retracted position.
Figure 21:
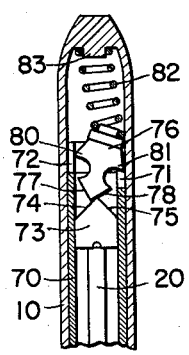
FIGURE 21 is a fragmentary view illustrating the release of the writing point from its retracted position.

Reference is now made to the drawings in detail with particular reference to the embodiment illustrated by FIGURES 1 to 9. Here, the writing instrument has a tubular main casing or barrel including the upper barrel section 10 and the lower barrel section 11, which sections are joined together by engagement with the threaded tubular plug 12. The upper end of the barrel section 10 is closed, while the lower portion 13 of the barrel section 11 is tapered inwardly, terminating in an open writing end. The bore passing through the barrel section 11 is reduced in cross-section at its lower end 14 to thereby form the interior annular lip 15. A hood 16, mounted for longitudinal movement within said reduced bore 14, is formed with the annular flange 17 at its inner end, while its outer portion 18 is tapered inwardly. The tubular hood 16 is also formed internally with the annular lips 19 and 19a. A point and cartridge unit 20, has the flange or flattened portion 21, includes the short terminal feed tube 22 at its lower end, and is formed with the annular shoulders 23 and 23a. The writing ball 24 is carried at the outer end of said tube 22. Fixed within the upper barrel section 10, as by frictional engagement, is a tubular latch receiving means 25. Said means 25 is formed at its upper end with a series of radially spaced upwardly projecting lugs 26, while a series of longitudinally extending deep recesses or slots 27 are defined between said lugs 26. Each of the lugs 26 is formed with a longitudinally extending shallow recess or slot 28, while lips 29 and 29' are formed at the bottom of said slots 27 and 28, respectively. A pair of upwardly projecting teeth 30 and 31 (see FIGURE 10) are formed by notching the top of each lug 26, said teeth 30 and 31 each having tapered sides 30' and 31' respectively, and the vertical sides 30" and 31" respectively. A tubular latch actuating element 32 is provided having the closed bottom end 33 which is formed with a transverse air vent 33a. A series of radially spaced ears 34 extend outwardly from the top portion of the element 32 and the series of upwardly extending teeth 35 are defined by the top edge of said element 32 and its ears 34. The radially projecting ears 34 extend into and are longitudinally movable within the slots 27 and 28 defined in the member 25, but are restrained against rotation by the sides of said slots. The lower portion of the tubular latch element 36 extends into the upper portion of the tubular latch actuating element 32. A series of radially spaced ears 37 extend outwardly from the upper portion of the latch element 36, and the bottom edge of said ears 37 are tapered so as to form the downwardly projecting teeth 38. The ears 37 are longitudinally movable within the deep slots 27 formed within the member 25, but cannot rotate when within the said slots. Also the ears 37 cannot extend into the shallow slots 28 because of their width.

The point and cartridge unit 20 slidably extends through the tubular plug 12, and its inner or upper end abuts the lower end 33 of the tubular actuating element 32, while the air vent 33a communicates with the interior of said cartridge unit. The relatively strong compression spring 39 has one end seating against the closed end wall of the barrel section 10 encircling the downwardly projecting boss 40, while its other end seats against the upper end of the ears 37 of tubular latch element 36. A second compression coil spring 41, surrounding a portion of said cartridge, is retained between the underside of the flange 21 and the top of the hood 16.

FIGURE 1 shows the writing instrument in a protracted position, preparatory to retracting the point. The strong spring 39 urges the latch element 36 downwardly, which in turn presses the latch actuating element 32 downwardly, which in turn bears against the upper end of the cartridge 20. The downwardly extending teeth 38 rest on the sides of the upwardly projecting teeth 35 formed atop the latch actuating member 32. The latch member 36 is prevented from turning, since its ears 37 are restrained by the sides of the slots 27 into which they extend. This restraint against rotary movement prevents the teeth 38 from sliding downward to the bottom of the V defined by the teeth 35. The latch actuating member 32, under the pressure described above, is restrained against longitudinal movement by its ears 34 seating upon the lips 29 and 29'.

When the writing instrument is pressed down against a rigid surface 42, as in FIGURE 2, first the point 24 along with its cartridge 20, and then the hood 16, move inwardly into the barrel against the pressure of the main spring 39. Both the latch element 36 and the latch actuating element 32 initially move upwardly together in the relative position shown in FIGURE 1, since the main spring 39 always maintains the latch element 36 in contact with the actuating member 32. However, once the ears 37, including the teeth 38, of the latch element 36 have passed out of the deep recesses 27 and are above the teeth 31, they then slide downward along the teeth 35 to the bottom of the V defined by said teeth 35, as shown in FIGURE 2, thereby partly rotating the latch element 36. The ears 34, however, are not lifted out from engagement within the slots 27 and 28 due to limitation of the upward movement as the lower end of the barrel section 11 engages the surface 42. As the instrument is lifted upwardly from the rigid surface 42, the latch actuating element 32 and latch element 36 begin to move downward under the pressure of the spring 39. However, the ears 37 of the latch element 36 soon come into contact with the tapered sides 31' of the teeth 31. The latch element 36 is again partially rotated as its projecting ears 37 now slide downward under pressure of the spring 39 along the tapered sides 31' of the teeth 31, until said ears are stopped by the vertical sides 30" of the teeth 30. The whole mechanism then assumes the position shown in FIGURE 3. It will be noted that the position of the latch member 36 is now higher within the barrel than it was in the protracted position of FIGURE 1 as it is retained atop the lugs 26 and cannot move downward any further. Thus, the spring 39 is effectively shortened. Meanwhile, the weaker spring 41 is expanded and urges the cartridge unit 20 upward against the bottom of the latch actuating member 32, and also urges the hood 16 outward to a protracting position. A balance is reached with the net result that the cartridge 20 is now positioned further within the barrel so that its point 24 is concealed within the hood 16.

To project the point from its retracted position, the instrument is again pressed downward against the rigid surface 42. This urges the point and cartridge unit 20 and the latch actuating element 32 upward. At the same time the member 32 urges the member 36 upward to thereby lift the ears 37 out of the notches defined by the teeth 30 and 31. As the ears 37 are moved upward and clear the teeth 30, they will again be given a slight rotary movement as they slide downwardly along the teeth 35 to the bottom of the V defined by said teeth 35, so that at the height of this upward movement, the ears 37 are now positioned above the tapered edges 30'. Then, as the instrument is lifted upward from the surface 42, the ears 37 slide along the tapered edges 30' until they drop into the slots 27 and the latch element 36 and latch actuating element 32 are forced downward against the pressure of the weak spring 41 under the influence of the stronger spring 39. The mechanism again assumes the position shown in FIGURE 1. Again it will be noted in FIGURE 1 that the position of the ears 37 is slightly offset from the ears 34. This offset may be accomplished by forming the ears 37 about the same width as the ears 34, but with the crown or apex of the teeth 38 offset from the crown or apex of the teeth 35 as shown. Since rotation of the ears 37 when within the slots 27, is prevented by the sides of said slots, the two sets of ears 37 and 34 again assume the position of FIGURE 1 where they are offset to each other since the apex or crown of each of the teeth 38 is offset to the apex or crown of the adjacent tooth 35.

The entire sequence of retraction and protraction is illustrated diagrammatically in FIGURE 10. Here the latch receiving means within the barrel has been enlarged and developed into a single plane. The small circles represent the position of an ear 37 of the latch member 36, while the numerals adjacent said circles represent its location at various stages of the protraction-retraction cycle. Initially, when the point is protracted into writing position, the ear 37 is at position 1, in a deep slot 27. When the writing instrument is pressed downward against a hard surface, the actuating member 32 carries the latch element 36 upward so that its ear 37 is now at position 2. As the ear 37 clears the vertical side 31" of the tooth 31, it is slightly rotated and drops downwardly to position 3 which is above the tapered side 31' of the tooth 31. As mentioned earlier, this slight rotation and downward movement is caused by the latch element's ears 37, slipping into deeper contact with the actuating element's teeth 35. Then, as the instrument is lifted from contact with the hard surface, the spring 39 urges the latch member 36 downward until it comes into engagement with the tapered side 31' of the tooth 31 (position 4). The ear 37 now slides to position 5, where it is stopped by the vertical edge 30" of the next tooth 30. The ear 37 is now in a retracted position. As the protraction cycle is begun, the ear 37 is lifted to position 6 as the actuating element 32 again raises the latch element 36 as before. The ear 37 then moves to position 7 as it is rotated and moves into deeper contact with teeth 35, then drops to position 8, is next slightly rotated again as it slides along the tapered edge 30' to position 9, and finally drops to position 1' where it is again in protracted position within a deep slot 27 and ready for the start of another cycle.

FIGURE 11 shows another embodiment of my invention, wherein the writing instrument is not only tip-actuated as was the embodiment of FIGURES 1 to 10, but is also top actuated. In other words, the writing point may be protracted or retracted by pressing the writing tip end of the instrument downward against a rigid surface, or it may be retracted or protracted by actuating a pushbutton projecting through the top end or top side of the instrument, or by any combination thereof. For example, the point may be moved from a retracted to a protracted position by depressing the pushbutton and then later moved from said protracted to a retracted position by pressing the writing tip end of the instrument against a rigid surface, or vice versa.

In FIGURE 11, the latch receiver 25', formed with the lugs 26, is fixed within the tubular sleeve 42. The sleeve 42 has a closed upper end 43 from which projects upwardly the pushbutton or stem 44. The stem 44 is externally accessible as it passes through a bore 45 formed in the upper end of the barrel section 10'. The sleeve 42 is also formed in its side with a slot 46. A second button 47 has its inner end fixed with said slot 46, as by frictional engagement or by gluing, while its outer end passes through a second slot 48 formed in the barrel section 10'. Upon pressing the writing point 24 down against a rigid surface, the instrument will operate in the same manner as did the embodiment of FIGURES 1 to 10. Thus, the latch receiver 25' remains stationary, while the members 32 and 36 are moved longitudinally to a latched position. Subsequent inward movement of the point 24 unlatches the locking mechanism. However, starting from the protracted position of FIGURE 11, by depressing the top button 44 into the barrel, or by moving the side button 47 longitudinally downward realtive to the barrel, then the latch receiver 25' is moved downward. Meanwhile, the members 32 and 36 do not move longitudinally since they are prevented from so doing by abutment of the member 32 with the cartridge unit 20, which in turn abuts against the hood 16, which in turn abuts against the lip 15 of the barrel section 11. As the latch receiver 25' moves longitudinally downward, its lugs 26 drop below the teeth of the member 36, permitting said teeth to partially rotate as they slide down to the bottom of the V defined by the teeth 35 of the member 32. Then as pressure is released on the pushbutton 44, said pushbutton and its sleeve 42 begin to return to their original position under influence of the spring 39. As the sleeve 42 moves upward, the tapered edges 31' of the member 25' engage the teeth 38 of the latch member 36 to thereby direct said teeth 38 to a locked position between teeth 30 and 31. This results in locking the spring 39 in a shortened position. As the spring 39 is now held shortened, the lower spring 41 will expand to urge the cartridge unit 20 inwardly. The cartridge unit 20, in turn, will urge the member 32 upwardly to thereby also move the members 36 and 42 upwardly so that the stem 44 projects through the bore 45 to a position where it can again be depressed. Subsequent longitudinal movement of one of the pushbuttons 47 or 44 relative to the casing, will result in the initial downward movement together of the members 42, 25', 32, 36 and 20. Near the end of this downward movement, the members 20, 32 and 36 will be restrained from further downward movement, although the members 42 and 25' will move slightly further down so that the teeth 30 and 31' disengage from the teeth 38. As this disengagement occurs, the ears 37 are partly rotated as the ears 37 slide down to the bottom of the "V" of the ears 34. Upon release of the pushbutton, the whole assembly will again assume the position of FIGURE 11.

FIGURES 12 to 16 represent another modification of the invention, which is both tip-actuated and pushbutton actuated, and wherein the latch means includes a locking ball engageable with the latch receiver. More specifically, the latch receiver 25" is fixed within the sleeve 42' and includes two upwardly projecting teeth 50 and 51, having the tapered sides 50' and 51' respectively and the vertical sides 50" and 51" respectively (see FIGURE 16). These two teeth define a deep recess between sides 50' and 51", and a shallow recess formed between the sides 50" and 51'. In addition, the tubular member 25" is further formed on its inner side with two radially opposed longitudinally extending recesses 52, each having a shallow transverse depth. A locking ball 53 is carried in the annular groove 54 formed in the cylindrical latch element 55. The tubular latch actuating member 56 is formed with a closed lower end 57 formed with an air vent, and the two transversely extending ears 58, which extend into the aforementioned slots 52 and are longitudinally movable therein. The upper end of said ears 58 extend past the main body of the member 56 and are formed into teeth 59, which are adapted for engagement with the locking ball 53.

The operation of this modification will now be described with particular reference to FIGURES 12, 13 and 16. FIGURE 16 is a schematic diagram wherein the circles represent the locking ball 53, while the letters inside said circles represent the position of the locking ball relative to the latch receiving means at various stages of the retraction-protraction cycle. FIGURE 12 shows the pen in a protracted position with the writing point 24 extended for writing (note the locking ball 53 is in position *a* of the schematic diagram of FIGURE 16). Upon pressing the point 24 against a rigid surface, the cartridge 20 is forced upwardly to thereby move the latch actuating element 56 also upwardly. In moving upward, one of the teeth 59 engaging the locking ball 53 will urge the ball 53 and the member 55 upwardly, until the ball 53 is above the top level of the tooth 51 (position *b*). The ball 53 will roll off the tooth 59 and on to the tapered surface 51' under the downward influence of the spring 39' which bears against the top of the latch member 55, always urging said latch member and the locking ball 53 downward. When the point 24 is lifted from contact with the rigid surface, upward pressure on the latch actuator 56 is released. Then under the downward pressure of spring 39', the locking ball 53 will roll along the tapered surface 51' until stopped by the vertical edge 50" of the next adjacent tooth (position *c*), thereby moving partially around the annular groove 54 formed in said member 55. The assembly will then assume the position shown in FIGURE 13. Here the ball 53 is seated in the aforementioned shallow recess, thus holding the latch member 55 further upwardly within the barrel to thereby shorten the main compression spring 39'. Since the spring 39' is held shortened, the lower spring 41 is expanded, urging the cartridge 20 upwardly. Because the upper end of said cartridge abuts the bottom side 57 of the latch actuating member 56, the upward movement of the cartridge is limited by the actuator member 56. The latch actuator 56, in turn, while pressed upward by the cartridge 20, is limited from any further upward movement by one of its teeth 59 engaging the ball 53. The ball 53, of course, is held down in engagement against the latch receiver 25" through the spring 39' acting upon its latch element 55. Upon a subsequent pressing of the lower end of the writing instrument against a rigid surface, the ball 53 will be lifted above the top of the tooth 50 (position d) by engagement with a guide tooth 59 as the inward movement of the cartridge 20 forces the latch actuator 56 further upward within the casing. The ball 53 will then roll onto and downwardly along the slanting surface 50' until finally stopped by the vertical edge 51" (position a') when the instrument is lifted clear of contact with the rigid surface. The spring 39' will now again be in an expanded position and the entire assembly will resume the protracted position shown in FIGURE 12.

The writing point may also be retracted or protracted by pressing the pushbutton 44' into the casing and subsequent releasing said pushbutton. Thus, with the point protracted as in FIGURE 12, then by pressing the stem 44' downward, the sleeve 42' carries the latch receiver 25" also downward until its teeth 50 and 51 drop below and out of contact with the ball 53. Meanwhile the ball 53 cannot move longitudinally downward because of its engagement with a tooth 59 of the member 56, which in turn engages the cartridge 20 which cannot move downward. As the latch receiver 25" drops completely from contact with the ball 53, said ball will still be contacting a beveled tooth 59 and will then roll downward along said tooth to position said ball above the tapered edge 51'. As pressure is released on the pushbutton, the latch receiver 25" again moves upward and the beveled edge 51' engages the ball 53 and causes it to rotate around its groove 54 until it strikes the edge 50". The whole assembly will then assume the position of FIGURE 13. It will be apparent from the foregoing that by again pressing down upon the pushbutton 44' and releasing it, the point 24 will again be extended in a manner similar to that previously described.

FIGURE 17 represents yet another modification of the invention, which is tip-actuated only. Here, the latching mechanism is quite similar to that of FIGURES 1 to 10. Thus, the tubular latch receiver 25'" is formed with the lugs 26 having teeth 30 and 31 at their upper ends, while engageable within the longitudinal slots formed in said latch receiver are the latch element 36 and the latch actuator 32. A plug 61, formed with an air vent 62 and a boss 63, is frictionally held or glued within the lower end of the tubular latch receiver 25'". A compression spring 64 has its lower end encircling the boss 63 and seating against the top of the plug 61, while its upper end seats against the latch element 36. The upper end of the cartridge 20, in turn, abuts against the plug 61. The upper end of the barrel or casing is closed, having the inner wall 65, against which the upper end 33 of the latch actuator 32 always bears. The operation of this mechanism is quite similar to that of the embodiment described in FIGURES 1 to 10 in that the ears 37 of the latch 36, are alternatingly directed into either a position within the deep slots 27 or to a position within the shallow notches between the teeth 30 and 31. For example, to retract the point 24 from the extended position of FIGURE 17, the instrument is pressed downward against a rigid surface to thereby force the cartridge 20 upward into the barrel. The cartridge 20 bears against the plug 61, which in turn moves the latch receiver 25'" upwardly. As this upward movement occurs, the latch actuator 32 is longitudinally immovable. However, as the lugs 26 move upwardly, the ears 37 will ride out of the deep slots 27, whereupon the pressure of the spring 63 will cause said ears 37 to slide upward fully into the inverted V defined by the teeth 35. Upon release of the instrument from contact with the rigid surface, the spring 63 will be held in a shortened position, since the ears 37 will now be engaged in the shallow slots between teeth 30 and 31. Since the spring 63 is shortened, the lower spring 41 is expanded to maintain the cartridge 20 in a retracted position so that its point 24 is so concealed within the hood 16. By again pressing the writing end of the instrument against a rigid surface, the writing point may again be protracted. Again the member 25'" will be moved upward until its teeth 30 and 31 move out of contact with the ears 37, whereupon said ears 37 again move into full contact within the inverted V of the teeth 35. Upon release of the writing end of the instrument from contact with the rigid surface, the ears 37 are engaged by teeth 30 and are partially rotated into alignment with the deep slots 27 so the instrument assumes the position of FIGURE 17. During the above described sequence of operation, the member 32 is fixed against either longitudinal or rotatable movement. The engagement of the end 33 against the wall 65 may engender sufficient frictional resistance to prevent any rotation of the member 32 or of the member 25'". However, if desired, this non-rotation can be insured by gluing the end 33 to the wall 65. It will be obvious from the foregoing that the principle of operation of the mechanism of FIGURE 17 is essentially the same as that of the embodiment of FIGURES 1 to 10.

Figure 22:
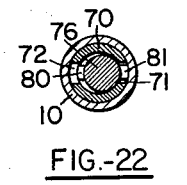
FIGURE 22 is a cross-sectional view taken along the lines 22—22 of FIGURE 18.
Figure 23:
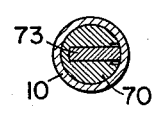
FIGURE 23 is a cross-sectional view taken along the lines 23—23 of FIGURE 18.
Figure 24:
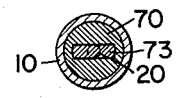
FIGURE 24 is a cross-sectional view taken along the lines 24—24 of FIGURE 18.

The embodiment of FIGURES 18 to 24 represent another embodiment of my invention. Here, the latch receiver 70 is fixed within the upper barrel section 10. The uppermost portion of said latch receiver 70 is tubular as shown by FIGURE 22 and is formed with a deep slot 71 and a shallow slot 72. The remaining portion of the hollow latch receiver 70 has a rectangular cross-section as shown by FIGURES 23 and 24. The latch actuator 73, also having a rectangular cross-section, is longitudinally movable within said latch receiver 70, but cannot rotate due to its rectangular cross-section. The upper portion of the flat latch actuator 73 is formed into a single tooth having the tapered sides 74 and 75, while its lower end loosely abuts the top of the point and cartridge unit 20. The lower portion of the latch 76 also has a rectangular cross-section which terminates in a single tooth having the tapered sides 77 and 78. The upper end of said latch 76 defines the cylindrical boss 79. Two diametrically opposed ears 80 and 81 extend outwardly from latch 76.

A strong compression coil spring 82 has one end encircling the boss 83 and seating against the upper inner end of the closed barrel section 10, while the other end of said spring encircles the boss 79 and seats against the latch 76.

FIGURE 18 shows the instrument in a protracted position. Here, the ear 81 is engaged within the deep slot 71 and the tooth side 77 of the latch is resting on the tooth side 75 of the actuator 73. The pressure of the strong spring 82 is thus transmitted through the latch 76, to the latch actuator 73, and then to the cartridge unit 20.

This downward pressure forces the cartridge unit 20 to an extended position against the upward pressure of the weak spring 41. To retract the writing point 24, the instrument is pressed down against the rigid surface 42 of FIGURE 19. This moves the latch actuator 73 upwardly, which in turn moves the latch 76 upwardly. Once the ear 80 of the latch is above the bottom of the shallow slot 72, the tapered edge 77 of the latch will slide slightly down the adjacent tapered edge 75 of the latch actuator. In so doing, the latch 76 is slightly tilted so that its ear 80 enters into the shallow slot 72. When the instrument is lifted from contact with the surface 42, then under the influence of the spring 82, the latch 76 and actuator 72 will initially tend to move downward together in the same relative position shown in FIGURE 19. However, the ear 80 will now come into engagement with the bottom lip of the slot 72, and the latch 76 will then pivot about this engagement point. This will result in the tooth side 77 sliding over the apex of the actuator 73 so that the side 78 will now engage the side 74. The assembly will thus assume the position of FIGURE 20. It will be noted here that the spring 82 is now held shortened so that the weaker spring 41 is able to become expanded to thereby urge the cartridge unit 20; upward to its retracted position and the hood 16 downward to its normally projecting position.

To protract the point, the instrument is again pressed against a rigid surface. The point and cartridge unit 20 moves the latch actuator 73 upward. As the actuator 73 moves upward, its side 74 slides slightly further up the contacting 78 side of the latch to thereby cause said latch 76 to pivot and swing the ear 80 out of the slot 72. Meanwhile, the other ear 81 is tilted into the deep slot 71 (see FIGURE 21). Then as the instrument is lifted from the rigid surface, the spring 82 is allowed to expand and returns the assembly to the position shown in FIGURE 18.

Various minor modifications can be made without departing from the present inventive concept. For example, in FIGURE 1 the hood 16 can be made of rubber or other flexible material and fixed to the barrel portion 11. In this case, the rubber tip should be sufficiently resilient to allow sufficient inward movement of the cartridge to actuate the retraction-protraction mechanism and yet be returned to its normal position, wherein it would appear as a more extension of the barrel. The embodiments of FIGURES 12 to 16 can be made tip-actuated only by eliminating the stem 44' and closing the top of the upper barrel section. Similarly, in FIGURE 11, either the side button 47 or the top button 44, or both, can be eliminated.

I claim:

1. A writing instrument having a retractable writing point comprising: a barrel having an open lower end; a hood carried by said barrel having an outer end normally extending past said lower end of said barrel, said outer end of said hood being inwardly movable relative to said barrel; a cartridge unit including a point, said cartridge unit being longitudinally movable within said barrel between a point-protracted position wherein said point extends through the outer end of said hood and a point-retracted position wherein said point is concealed within said hood; a first compression spring urging said cartridge unit inwardly relative to said barrel; a latch receiver having longitudinally spaced first and second abutments respectively defining point-retracted and point-protracted positions; a latch selectively abuttingly engageable with said first and second abutments of said latch receiver; a latch actuator longitudinally movable relative to said latch receiver and said latch but non-rotatable relative to said latch receiver, said latch actuator abutting said latch; said cartridge unit having an upper end abutting one of said latch actuator and said latch receiver, and a second compression spring, stronger than said first spring, having an end seating against said latch and urging said latch into abutting engagement with said latch actuator and said latch receiver; said latch actuator being adapted to alternatingly direct said latch into abutting engagement with said first and second abutments upon succeeding sequences of longitudinal movements of said cartridge unit obtained by pressing said point and said hood outer end into contact with a rigid surface to move said point and hood outer end inwardly relative to said barrel and then releasing said point and said hood outer end from said contact, said latch when abuttingly engaged with said first abutment being operable to maintain said second spring in a compressed position whereby said first spring will urge said cartridge unit to its retracted position, said latch when abuttingly engaged with said second abutment being operable to allow said second spring to expand whereby said cartridge unit is forced to a protracted position against the pressure of said first spring.

2. A writing instrument according to claim 1, wherein said latch includes projecting ears, said latch actuator includes teeth engageable with said ears, and said latch receiver is formed with a deep longitudinally extending recess and a shallow longitudinally extending recess, said recesses defining said first and second abutments.

3. A writing instrument according to claim 1 wherein said latch receiver is fixed within said barrel and said latch is longitudinally movable relative to said barrel and latch receiver.

4. A writing instrument according to claim 1, wherein said writing instrument also includes a pushbutton extending through the upper portion of said barrel and longitudinally movable with one of said latch receiver and said latch actuator.

5. A writing instrument according to claim 4, wherein said pushbutton extends through the side of said writing instrument and engages said latch receiver, being longitudinally movable therewith.

6. A writing instrument according to claim 4, wherein said pushbutton extends through the top end of said instrument and engages said latch receiver, being longitudinally movable therewith.

7. A writing instrument according to claim 1, wherein said latch includes a cylinder defining an annular groove and a locking ball partly within said groove and movable around said cylinder while in said annular groove.

8. A writing instrument comprising a casing having an open lower end, a hood carried by said casing having an inner end disposed within said casing and an outer end, a point and cartridge unit longitudinally movable within said hood, a first spring engaged between said hood and said cartridge unit urging said cartridge unit upwardly and said hood outwardly relative to said casing, a latch receiver within said casing and defining a deep longitudinally extending recess and a shallow longitudinally extending recess, a latch engageable within said deep recess and said shallow recess, a latch actuator having a lower end engaging said cartridge unit and an upper end engageable with said latch, a second spring stronger than said first spring and adapted to urge said latch downwardly into contact with said latch actuator and said latch receiver, said latch and latch actuator being longitudinally movable against the pressure of said second spring upon the inward movement of said cartridge unit relative to said barrel, said latch actuator having teeth adapted for engagement with said latch whereby said latch is alternatingly directed to a position within said deep recess and a position within said shallow recesses upon reciprocal longitudinal movement of said cartridge, said latch when engaged within said shallow recess being operable to maintain said second spring in a compressed position whereby said first spring will urge said cartridge to a retracted position, said latch when engaged within said deep recess being operable to allow said second spring to expand whereby said cartridge unit is forced to a protracted position against the pressure of said first spring.

9. A writing instrument according to claim 8, wherein said latch receiver is fixed within said casing.

10. A writing instrument according to claim 8, wherein said latch receiver is longitudinally movable relative to said casing.

11. A writing instrument comprising a casing having an open lower end, a hood carried by said casing having an inner end disposed within said casing and an outer end, a point and cartridge unit longitudinally movable within said hood, a first spring engaged between said hood and said cartridge unit urging said cartridge unit upwardly and said hood outwardly relative to said casing, a latch receiver engaging said cartridge and longitudinally movable therewith and defining a deep longitudinally extending recess and a shallow longitudinally extending recess, a latch engageable within said deep recess and said shallow recess, a latch actuator having a lower end engageable with said latch, a second spring stronger than said first spring and adapted to urge said latch into contact with said latch receiver, said latch actuator having teeth adapted for engagement with said latch whereby said latch is alternatingly directed to a position within said deep recess and a position within said shallow recess upon reciprocal longitudinal movement of said cartridge, said latch when engaged within said shallow recess being operable to maintain said second spring in a compressed position whereby said first spring will urge said cartridge to a retracted position, said latch when engaged within said shallow recess being operable to allow said second spring to expand whereby said cartridge unit is forced to a protracted position against the pressure of said first spring.

References Cited in the file of this patent

UNITED STATES PATENTS

| | | |
|---|---|---|
| 2,790,422 | Grumbach | Apr. 30, 1957 |
| 2,930,354 | Lockwood | Mar. 29, 1960 |
| 2,989,032 | Bross | June 20, 1961 |
| 2,990,205 | Weisser | June 27, 1961 |

FOREIGN PATENTS

| | | |
|---|---|---|
| 88,655 | Germany | Sept. 25, 1896 |
| 185,711 | Austria | May 25, 1956 |
| 10,026 | Great Britain | of 1887 |
| 738,695 | Great Britain | Oct. 19, 1955 |
| 792,185 | Great Britain | Mar. 19, 1958 |
| 810,719 | Great Britain | Mar. 18, 1959 |
| 1,156,612 | France | Dec. 16, 1957 |